UNITED STATES PATENT OFFICE.

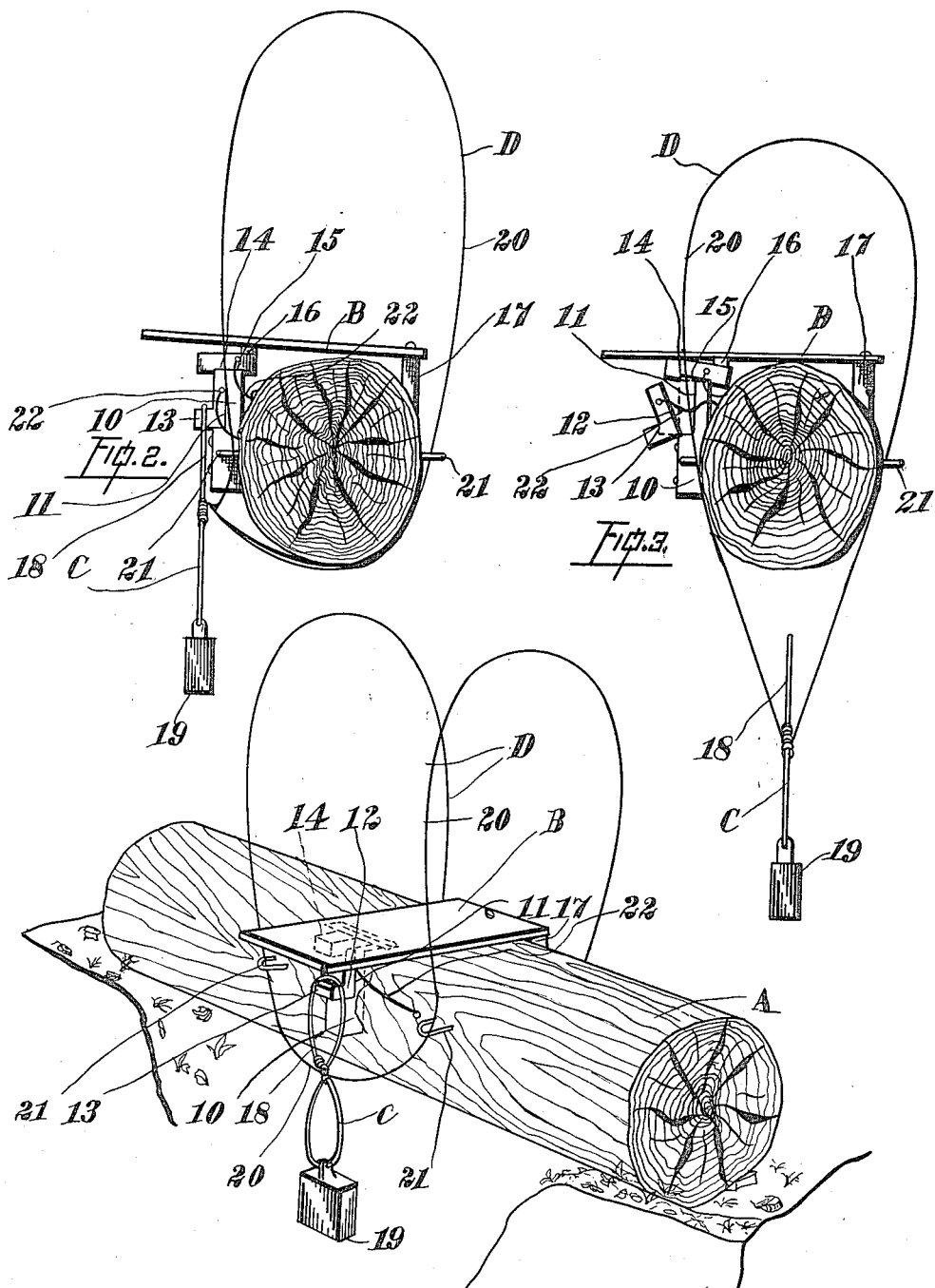

SAMUEL WIEHL, OF SISTERS, OREGON.

ANIMAL-TRAP.

1,075,236.

Specification of Letters Patent.  Patented Oct. 7, 1913.

Application filed October 3, 1912.  Serial No. 723,723.

*To all whom it may concern:*

Be it known that I, SAMUEL WIEHL, a citizen of the United States of America, and resident of Sisters, Crook county, State of Oregon, United States of America, have invented certain new and useful Improvements in Animal-Traps, of which the following is the specification.

My invention relates to animal traps and the objects of my invention are to provide a trap which is readily adaptable for use on any log which forms the mode of passage for the animal, to provide a trap which in no way damages the fur of the animal and which is adapted for animals of all reasonable sizes.

Further objects are to provide such a trap that is of simple structure, cheap, easily set and yet efficient.

In brief my invention comprises loops vertically slidable on a log or tree trunk and adapted to descend with great rapidity on the animal's back as it passes along the log. The loops may be actuated by a weight controlled trigger mechanism which is released by the weight of the animal itself as it places its foot upon a board located on the surface of the log, all of which will be hereinafter more particularly described in the accompanying drawings and specification.

Referring to said drawings: Figure 1 represents a perspective view of my invention in use. Fig. 2 an end view of the trap in set position. Fig. 3 an end view of the same in released position.

In the carrying out of my invention a log or tree trunk A is chosen which bridges the brink of a ravine or chasm and which is known to be the usual means of transit for the animal from one brink to the other. A supporting member 10 is secured to one side of this log A provided with a recess 11 into which fits a trigger member 12 provided with a laterally extending projection 13. The trigger member 12 is held in the recess 11 by the use of a detent member 14 provided with a notch 15 adapted to fit loosely over the extremities of the trigger 12 and the support 10. A foot-board B is placed transversely across the log, said foot-board being provided on one side with a ridge or projection 16 which rests lightly on one end of the detent member 14 while the end of the foot-board is loosely pivoted to a fulcrum element 17 secured to the other side of the log.

The actuating means for the device comprise a pendant member C provided at one of its extremities with a loop 18 adapted to fit over the projection 13 and bear thereon while the other extremity is provided with a weight or other actuating means 19.

The detaining or catching means for the trap consist of loops D made preferably of a single strip 20 of rigid yet flexible material such as wire adapted to slide vertically in each side of the log A in suitable eyes or staples 21, said loops being secured to the pendant member C and capable of being operated thereby.

In order to prevent the loss of the various loose elements of the device the members 12 and 14 may be secured to the log A by cords 22 of length ample enough not to interfere with the working of the trap.

The operation of the device is as follows: The trigger is fitted into the recess 11 of the support and the detent 14 placed thereon so that the notch 15 embraces the extremities of both the support 10 and the trigger 12. The foot-board B is then placed lightly on the detent member 14 so that the ridge 16 rests lightly on the extremity thereof after which the loop 18 of the pendant member C is placed over the projection 13 of the trigger member 12; this causes the loops D to slide upwardly in the eyes 21 in which position the trap is ready for action. It is now evident that as soon as the animal, in passing through the loops 20, places its foot upon the board B it will by its own weight tilt the detent 14 and thus release the trigger member 12; the weight 19 acting immediately will cause the loops to instantly descend upon the animal's body trapping it securely to the body of the log A.

The device may be used with bait or without.

As many changes could be made in the above construction and many apparently widely different embodiments of my invention, within the scope of the claims, constructed without departing from the spirit or scope thereof, it is intended that all matter contained in the accompanying specification and drawings, shall be interpreted as illustrative and not in a limiting sense.

What I claim as my invention is:

1. An animal trap comprising a log, detaining loops adapted to descend thereover, a catch device for holding the loops in raised position, a detent member adapted to hold the catch device in set position, and a foot-board adapted to actuate the detent member to release the catch device and means for causing said loops to descend when the catch device is released.

2. An animal trap comprising a log, eyes situated in the sides thereof, detaining loops slidable in said eyes adapted to descend over the log, a support provided with a recess, a trigger member located in the recess adapted to hold the loop in raised position, a detent member adapted to hold the trigger in the recess and a foot-board adapted to actuate the detent member to release the trigger and means for causing said loops to descend when the trigger is released.

3. An animal trap comprising a log, eyes situated in the sides thereof, detaining loops slidable in said eyes adapted to descend over the log, a support provided with a recess, a trigger member provided with a projection located in the recess adapted to hold the loops in raised position, a detent member provided with a notch adapted to hold the trigger in set position and a foot-board provided with a ridge adapted to tilt the detent member and release the trigger and means for causing said loops to descend when the trigger is released.

4. An animal trap comprising a log, eyes situated in the sides thereof, a support provided with a recess, a trigger member provided with a projection located in said recess, a pendant member releasably secured to said projection, a weight secured to the pendant member, loops slidable in the eyes comprising a single strip of pliable material adapted to descend over the log secured to the pendant member, a detent member adapted to hold the trigger in the recess, a foot-board pivotally secured to the log adapted to tilt the detent member and means for securing the trigger and detent member to the log.

5. An animal trap comprising a log, detaining loops adapted to descend thereover comprising a single strip of pliable material, a catch device for holding the loops in raised position, a detent member adapted to hold the catch device in set position, a fulcrum element secured to the log and a foot-board loosely pivoted to the fulcrum element adapted to actuate the detent member to release the catch device and means for causing said loops to descend when the catch device is released.

In witness whereof I have hereunto set my hand in the presence of two witnesses.

SAMUEL WIEHL.

Witnesses:
P. J. LEITHAUSER,
E. H. HOWELL.

Copies of this patent may be obtained for five cents each, by addressing the "Commissioner of Patents, Washington, D. C."